US005337811A

United States Patent [19]

Fulghum, Jr. et al.

[11] Patent Number: 5,337,811

[45] Date of Patent: Aug. 16, 1994

[54] DEBARKER INFEED CONVEYOR

[75] Inventors: Oscar T. Fulghum, Jr.; Arthur E. Freyre, both of Wadley, Ga.

[73] Assignee: Fulghum Industries, Inc., Wadley, Ga.

[21] Appl. No.: 925,275

[22] Filed: Aug. 6, 1992

[51] Int. Cl.⁵ .......................... B27L 1/00; B65G 47/34

[52] U.S. Cl. ............................ 144/208 B; 144/208 R; 144/242 R; 144/341; 198/463.3; 414/746.7

[58] Field of Search .................. 198/463.3, 592, 861.5; 414/746.6, 746.7; 144/208 R, 208 B, 242 R, 340, 341

[56] References Cited

U.S. PATENT DOCUMENTS

| | | | |
|---|---|---|---|
| 626,138 | 5/1899 | Butterfield . | |
| 889,292 | 6/1908 | Bache . | |
| 1,228,374 | 5/1917 | Ross . | |
| 1,233,321 | 7/1917 | Cew . | |
| 1,904,937 | 4/1933 | Strindlund . | |
| 1,932,250 | 10/1933 | Paulson . | |
| 2,038,471 | 4/1936 | Benatar . | |
| 2,140,287 | 12/1938 | Guettler . | |
| 2,249,588 | 7/1941 | Waddle . | |
| 2,338,136 | 1/1944 | Shaw . | |
| 2,391,802 | 12/1945 | Shaw . | |
| 2,422,757 | 6/1947 | Swift . | |
| 2,665,721 | 1/1954 | Busch . | |
| 2,688,350 | 9/1954 | Waller . | |
| 2,799,308 | 7/1957 | Makinson . | |
| 2,840,041 | 6/1958 | Fleming . | |
| 2,943,656 | 7/1960 | Wakeman . | |
| 3,080,898 | 3/1963 | Schnyder . | |
| 3,136,345 | 6/1964 | Dick . | |
| 3,197,017 | 7/1965 | Ungerer | 198/463.3 |
| 3,215,176 | 11/1965 | Ferrabee . | |
| 3,299,919 | 1/1967 | Saresvuo . | |
| 3,417,796 | 12/1968 | Leider . | |
| 3,457,975 | 7/1969 | Wehr . | |
| 3,737,021 | 6/1973 | Reth et al. | 198/463.3 |
| 3,749,326 | 7/1973 | Aro . | |
| 3,752,296 | 8/1973 | Peterson | 198/592 |
| 3,771,641 | 11/1973 | Jonsson . | |
| 3,807,469 | 4/1974 | Schnyder . | |
| 3,807,470 | 4/1974 | Young . | |
| 3,878,936 | 4/1975 | Niggemyer . | |
| 3,923,087 | 12/1975 | Young . | |
| 3,948,300 | 4/1976 | Young . | |
| 3,973,606 | 8/1976 | Carbonneau . | |
| 4,020,883 | 5/1977 | Nicholson . | |
| 4,044,893 | 8/1977 | Ekholm . | |
| 4,105,107 | 8/1978 | Ekholm . | |
| 4,170,911 | 10/1978 | Ayers . | |
| 4,173,239 | 11/1979 | Reiche . | |
| 4,180,109 | 12/1979 | Heikkinen . | |
| 4,204,595 | 5/1980 | Marrs . | |
| 4,295,507 | 10/1981 | Karlsson . | |
| 4,362,195 | 12/1982 | Hill . | |

(List continued on next page.)

FOREIGN PATENT DOCUMENTS

| | | |
|---|---|---|
| 92338 | 5/1938 | Switzerland . |
| 941183 | 8/1989 | U.S.S.R. . |

*Primary Examiner*—W. Donald Bray
*Attorney, Agent, or Firm*—Cushman, Darby & Cushman

[57] ABSTRACT

An infeed conveyor for feeding wood of a variety of types and lengths to a debarking drum which can be adjusted in height so as to optimize the infeed conditions as desired. The conveying apparatus is adapted to convey tree-length logs to a debarking drum. To that end, the system includes a foundation and a conveyor disposed vertically above the foundation. The conveyor has an inlet end at which logs to be debarked are loaded and an outlet end adjacent the debarking drum. The conveyor is mounted to the foundation so that the height of the inlet end and/or the outlet end can be selectively varied with respect to the foundation assembly. The conveyor is then held at least temporarily held at a selected height and/or inclination.

43 Claims, 13 Drawing Sheets

U.S. PATENT DOCUMENTS

| | | | |
|---|---|---|---|
| 4,369,823 | 1/1983 | Gustafsson . | |
| 4,374,533 | 2/1983 | Svensson . | |
| 4,432,403 | 2/1984 | Heikkinen . | |
| 4,445,558 | 5/1984 | Banner . | |
| 4,505,377 | 3/1985 | Sundberg . | |
| 4,506,713 | 3/1985 | Gaitten . | |
| 4,509,574 | 4/1985 | Gaitten . | |
| 4,510,981 | 4/1985 | Biller . | |
| 4,582,106 | 4/1986 | Huhta . | |
| 4,585,042 | 4/1986 | Hutson . | |
| 4,596,280 | 6/1986 | Svensson . | |
| 4,603,718 | 8/1986 | Hutson . | |
| 4,662,505 | 5/1987 | Bunney . | |
| 4,673,013 | 6/1987 | Saalasti . | |
| 4,685,498 | 8/1987 | Nakajima . | |
| 4,691,750 | 8/1987 | Nakajima . | |
| 4,774,987 | 10/1988 | Sepling . | |
| 4,805,677 | 2/1989 | Wallin . | |
| 4,946,024 | 8/1990 | Forsberg . | |
| 4,977,999 | 12/1990 | Smock | 198/463.3 |
| 5,044,412 | 9/1991 | Price . | |
| 5,193,363 | 3/1993 | Petty | 198/592 |

DEBARKER INFEED CONVEYOR

BACKGROUND OF THE INVENTION

1. Field of the Invention

The present invention relates to an apparatus for conveying tree-length logs to and into a debarking drum.

2. Description of the Related Art

Wood chipping facilities, so-called chip mills, may be provided on location at pulp and paper mills or off site to produce wood chips from hard wood and/or pine logs for the paper making process. Chip mills receive and process large quantities of logs of varying lengths. Typically, at mills where long wood is processed, a crane is used to unload trees from trucks and transport them to storage piles. During the chipping process, the crane is used to transport logs to a debarking drum. In most conventional systems, an infeed chute is used to direct long wood or tree length logs deposited by the crane into the debarking drum.

However, it can be difficult to feed logs to the infeed chute in the event that both long and short logs are being processed, as the shorter logs may not be evenly grasped by the crane and may drop. In addition, chute-type feeding methods are typically low capacity and necessarily intermittent as the crane must periodically retrieve logs to infeed. Thus, while it would be advantageous to debark and chip tree length wood so that pre-chipping processing is not necessary, the ability to debark tree-length logs has been impaired by the presence of a variety of log lengths, the low capacity of chute-type long wood feeding methods, and the intermittent mode of operation necessitated by crane delivery to a chute.

A further deficiency of prior art methods of feeding logs into a debarking drum is that it is not possible to alter the system once constructed. Accordingly, while certain infeed conditions may be more desirable for some types of wood at some times of year and/or certain conditions may be more desirable for logs of a particular length, conventional log infeed systems can not be adapted to accommodate the particular log length and type which is being processed or the particular debarking drum which is provided.

SUMMARY OF THE INVENTION

It is an object of the present invention to provide an apparatus for feeding wood of a variety of lengths to a debarking drum.

It is a further object of the invention to provide an infeed conveyor for feeding wood of a variety of types and lengths to a debarking drum which can advantageously be adjusted in height so as to optimize the infeed conditions as desired.

The foregoing and other objects of the invention are realized by providing an apparatus for conveying tree-length logs to a debarking drum which includes a foundation and a conveyor disposed vertically above the foundation. The conveyor has an inlet end at which logs to be debarked may be loaded and an outlet end adjacent the debarking drum. The conveyor is mounted to the foundation so that the height of the inlet end and/or the outlet end can be selectively varied with respect to the foundation assembly. The conveyor can then be at least temporarily held at one of a plurality of heights and/or inclinations.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings, all of which form a part of this specification.

DETAILED DESCRIPTION OF THE PRESENTLY PREFERRED EXEMPLARY EMBODIMENT

Figure 1:
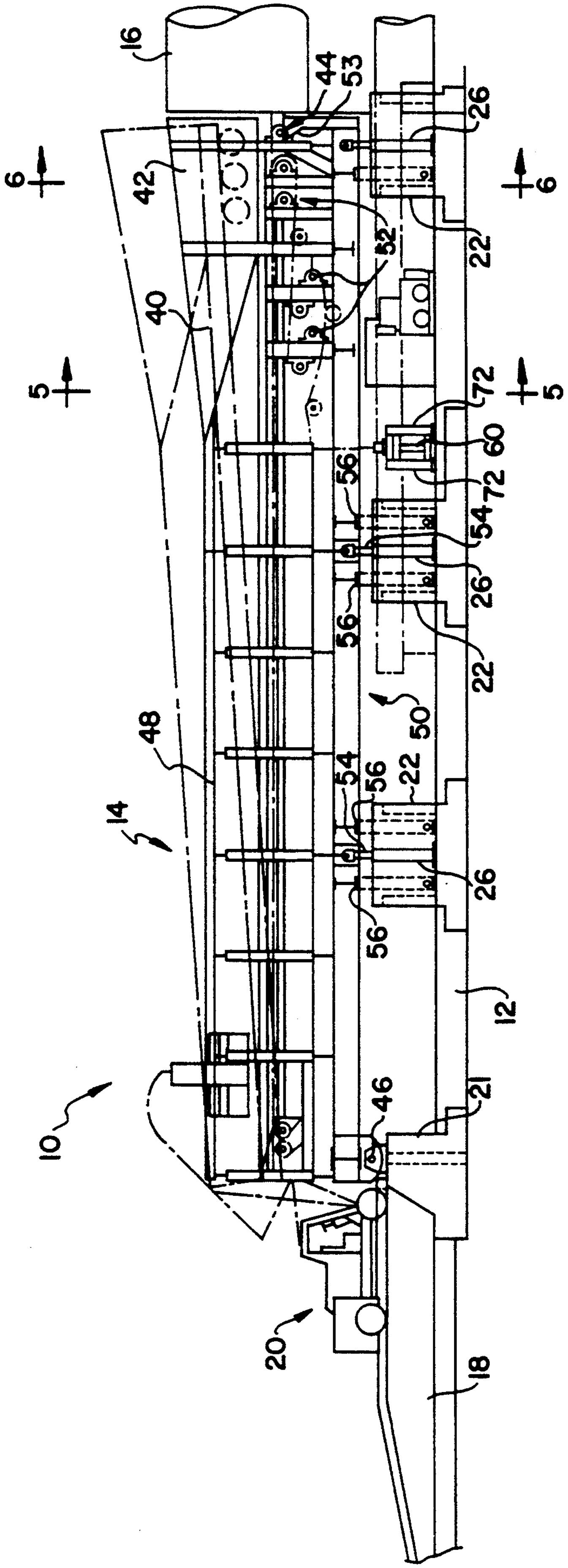
FIG. 1 is an elevational view of an adjustable debarker infeed conveyor provided in accordance with the present invention.

A debarker infeed conveyor 10 in accordance with the present invention is shown in elevation in FIG. 1. The infeed conveyor 10 includes a number of unique structural characteristics and functional attributes, some of which may not be readily apparent from the elevational view of FIG. 1. Accordingly, a detailed description of those advantageous and distinct components of the assembly will be made with reference to partial and/or isolated views of those components.

The overall assembly and interrelation of the various components of the structure may be best understood by characterizing the conveyor apparatus 10 as including a substructure or foundation 12 which remains fixed with respect to the ground and which supports an infeed conveyor system 14 so that the conveyor can be adjusted in height and/or inclination with respect to the foundation 12 and hence the ground.

Figure 2:
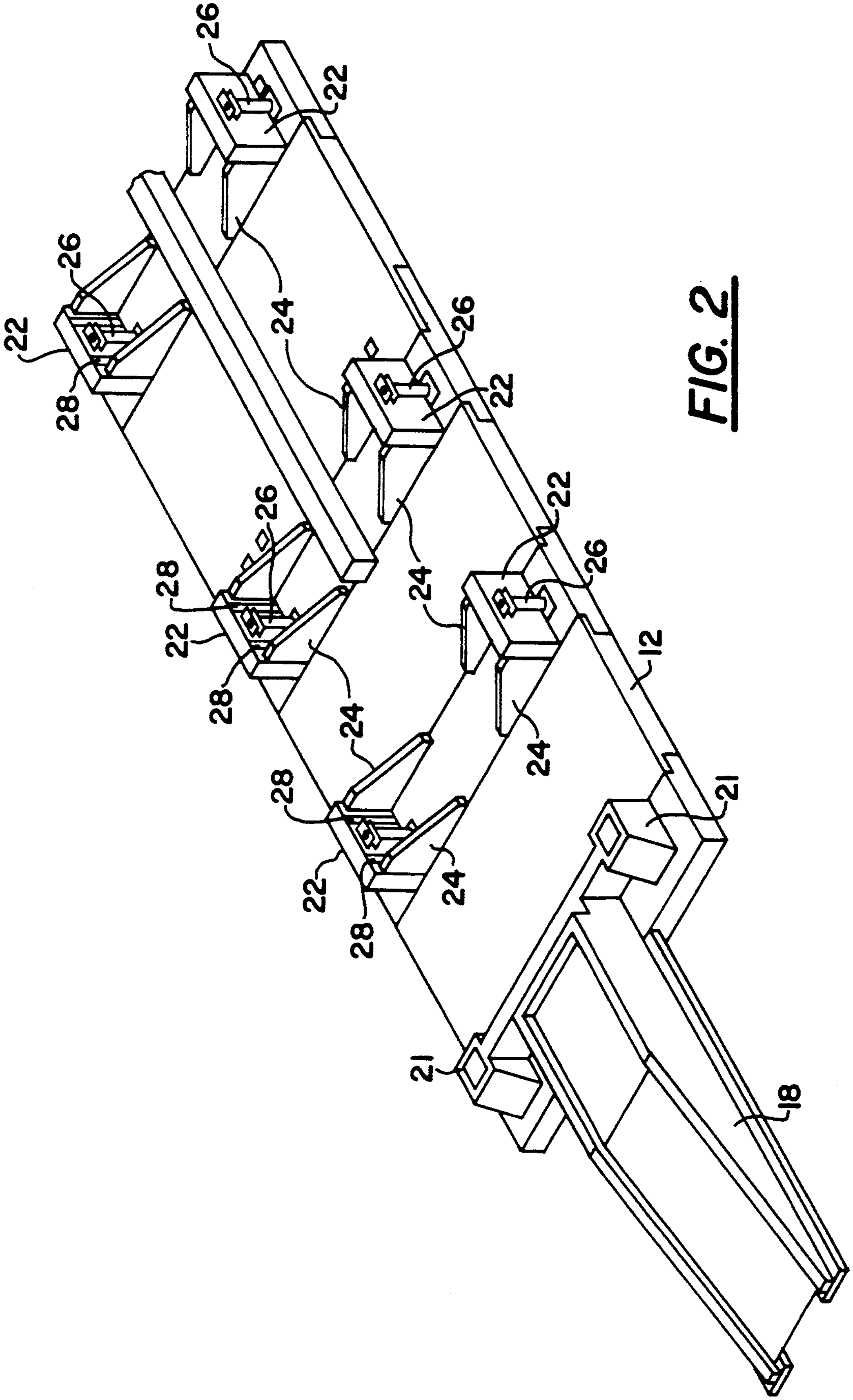
FIG. 2 is an isometric view of the foundation of the debarker infeed conveyor of the invention.

The foundation 12 of the conveyor of the invention is shown in FIG. 2. A debarking drum 16, which is only schematically shown in FIG. 1, is provided on the downstream end of the conveyor system 14. Although the debarking drum 16 does not, without more, form a part of this invention, it should be noted that a debarking drum 16 having a diameter of about fourteen feet is advantageously used with the inventive infeed conveyor 10.

A ramp 18 is defined at the inlet or upstream end of the conveyor system 14, as shown in FIGS. 1 and 2. The ramp may be used by heavy duty vehicles 20 to load logs onto the conveyor surface. In addition or in the alternative, crane(s) may be used to side load the conveyor from stock pile(s) and/or trucks.

The base or foundation assembly 12 is formed from concrete which has been reinforced with a plurality of reinforcing rods, typically steel rods. At spaced locations along the length of the base, legs are formed from reinforced concrete. In the illustrated embodiment, the pair of legs 21 closest to the inlet ramp 18 are adapted to support the inlet end of the conveyor system 14, as described more particularly below. Three additional pairs of legs 22 are provided at spaced locations along the length of the foundation 12. Each of the additional pairs of legs 22 has stays 24 which extend inwardly towards the longitudinal axis of the foundation 12. A pair of columns 26 is associated with each of the additional pairs of legs 22, one on each longitudinal side thereof, only one of which is shown in the view of FIG. 2, the other being hidden by the respective leg. Each of the columns 26 is mounted to a steel support (not shown) which is embedded in the concrete foundation so as to have an exposed upper surface to which the column 26 can be fastened. As can be seen, the columns 26 have a height corresponding to the maximum height of the stays 24.

As noted above, each of the legs 22 are formed from concrete with steel reinforcement. Embedded in those legs 22 are vertical steel reinforcement plates which are positioned to be exposed as shown at 28. The exposed steel reinforcement plates 28 are adapted to contact bumpers, slides and/or wheels 30 which depend downwardly from the conveyor assembly, as described more particularly below. It should be noted, furthermore, that because of the generally closed U-shaped configuration of the stays 24 and legs 22, one or more drain holes (not shown) are advantageously provided in the leg 22 adjacent the to stays to allow passage of rain water.

Figure 3:
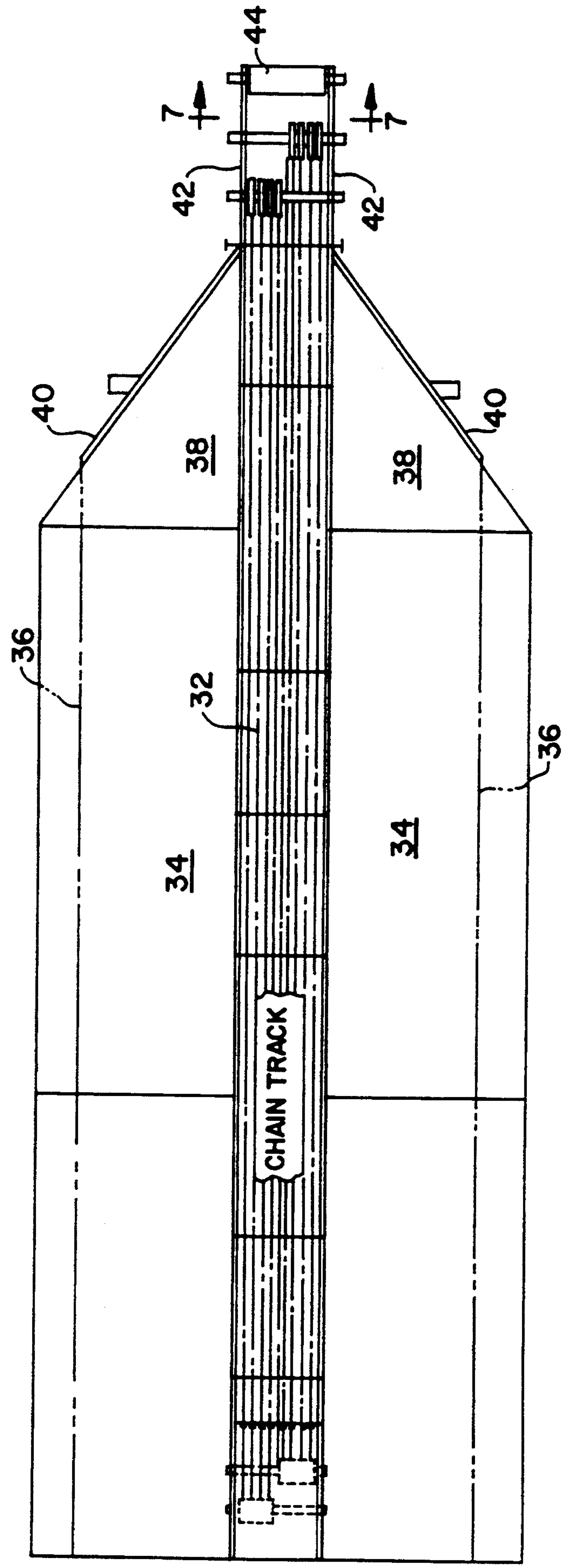
FIG. 3 is a top plan view of the conveyor assembly, with sub-frame and foundation omitted for clarity.
Figure 4:
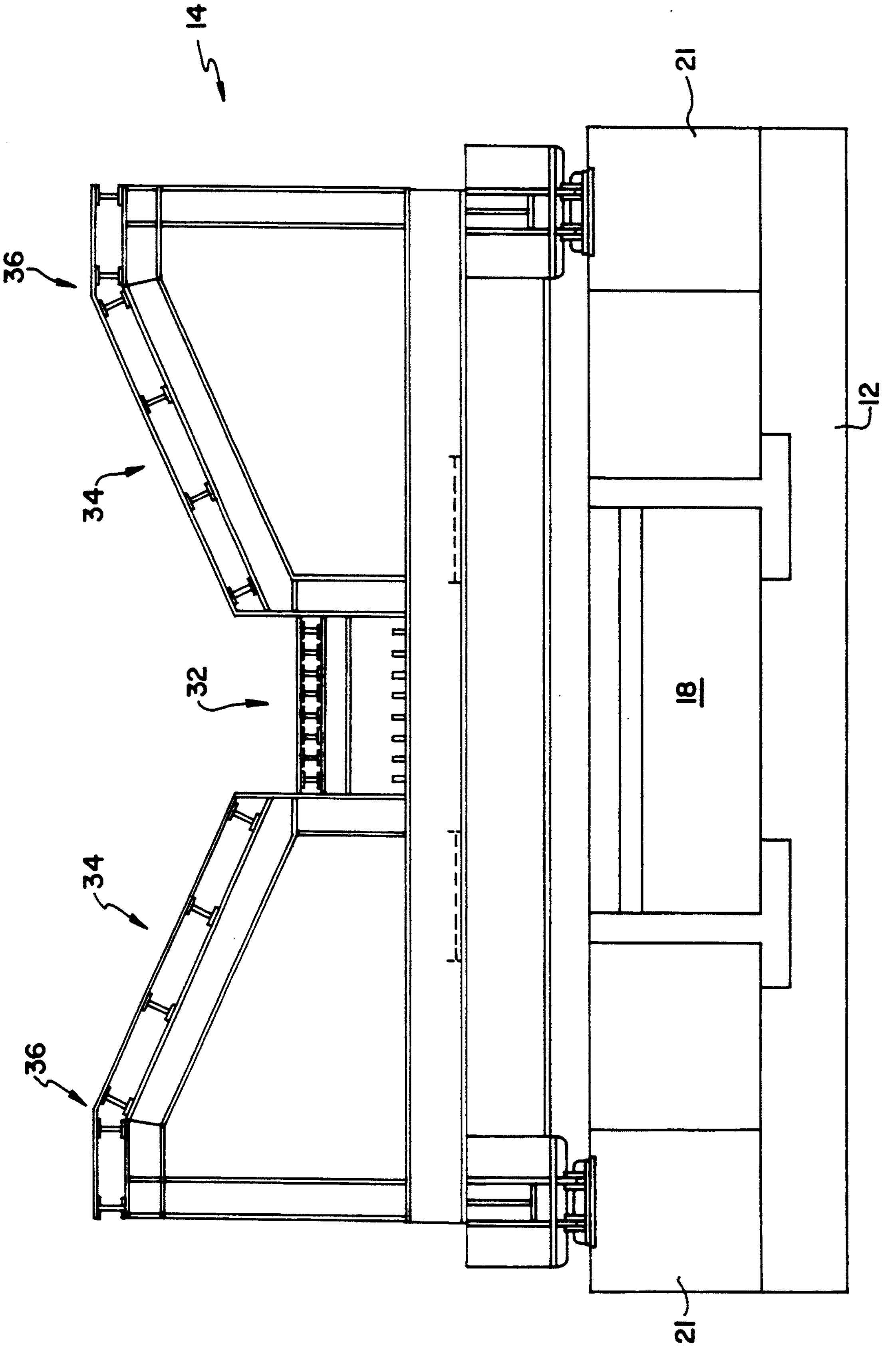
FIG. 4 is an elevational view of the inlet end of the debarker infeed conveyor of the invention.

A top plan view of the upper, conveyor portion 14 of the infeed system of the invention is shown in FIG. 3. As can be seen, an elongated conveyor 32 is provided to extend along the central longitudinal axis of the conveyor assembly. In the preferred embodiments, the conveyor is a chain conveyor, but other known conveyor types could be used as an alternative. A trough for containing logs on the conveyor surface is defined by upwardly inclined side walls or log decks 34. The side walls of the infeed trough are bent as at 36 and thereafter extend outwardly in a generally horizontal plane (FIG. 4). In the alternative, vertical containing walls 35 can extend upwardly from decks 34 to ensure that the logs are contained on the trough (FIG. 14).

Figure 5:
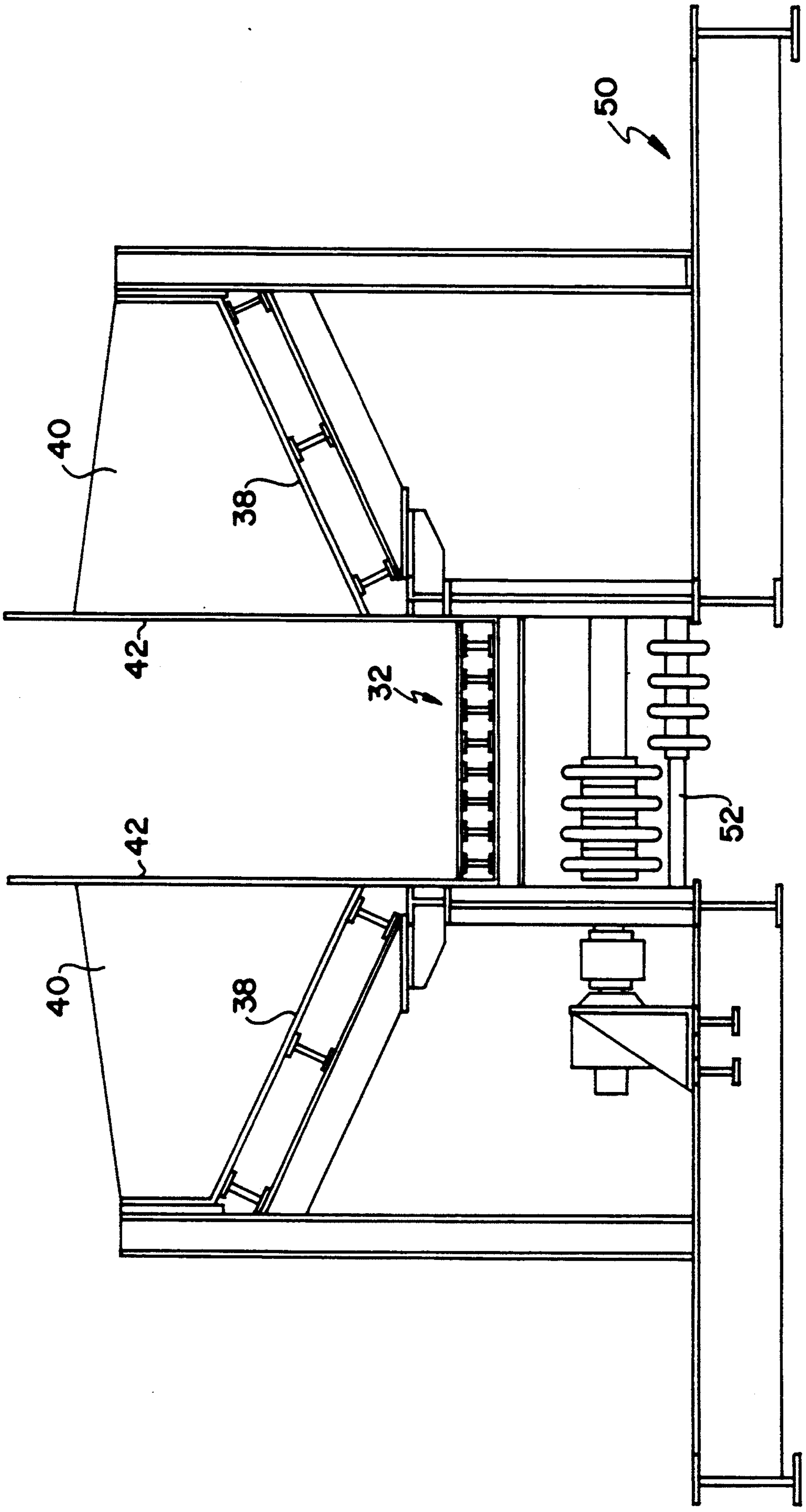
FIG. 5 is a cross-sectional view taken along line 5—5 of FIG. 2.
Figure 6:
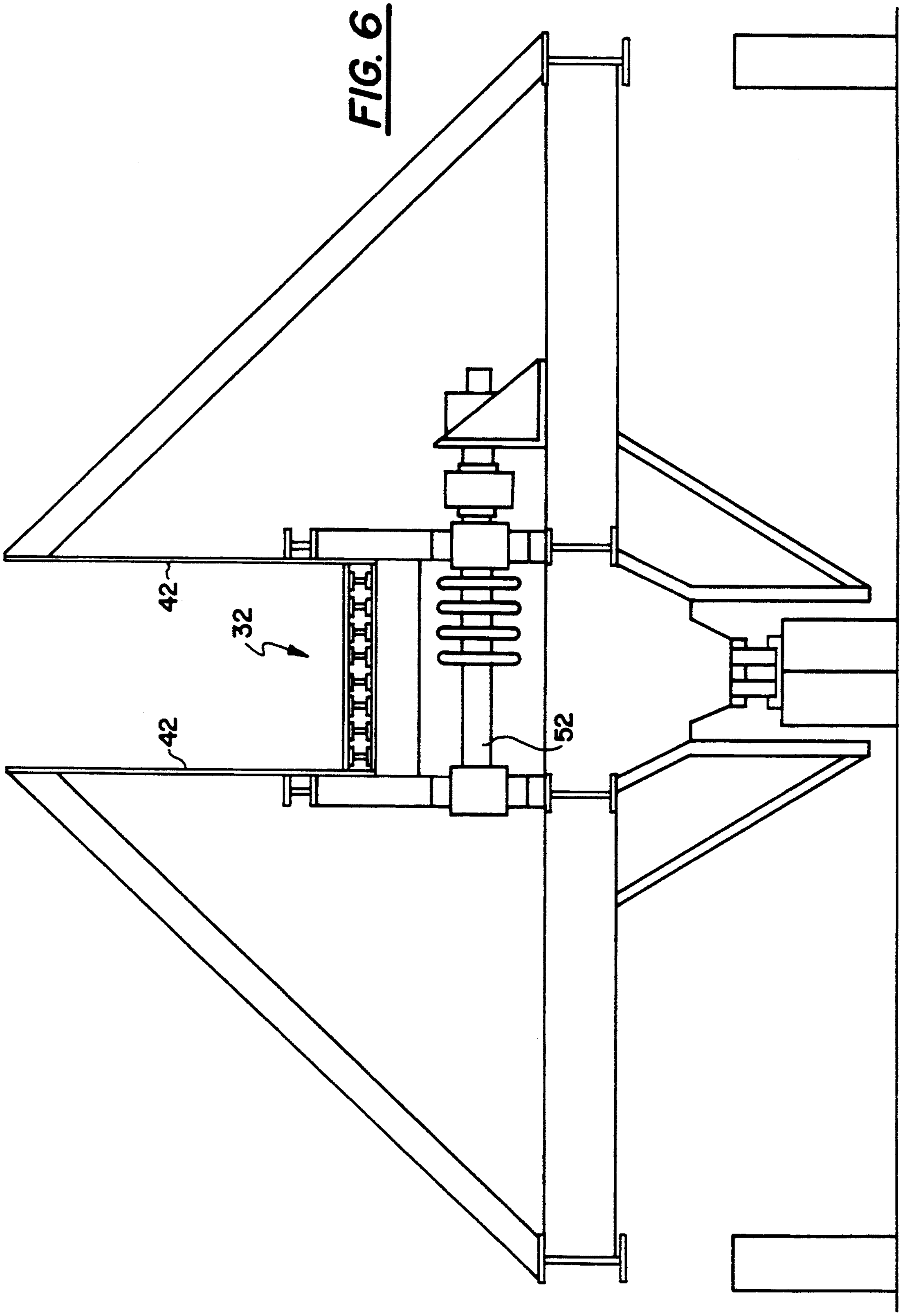
FIG. 6 is a cross-sectional view taken along line 6—6 of FIG. 2.

The conveyor assembly can be virtually any length, but may be, for example, on the order of about 100 feet. Further, in the illustrated embodiment, the conveyor trough has a total width of about 34 feet. About 30 to 35 feet from the infeed end of the debarking drum 16, the trough side walls or log decks 34 of the conveyor, taper downwardly, inwardly towards the chain conveyor as at 38 (FIG. 3). A correspondingly tapered vertical deck 40 is mounted to extend vertically upwardly from the upper edge of the tapered log deck 38. Thus, the tapered vertical deck 40 as shown in FIGS. 1 and 5, is substantially triangular having a maximum height where the tapered log deck 38 meets the chain conveyor 32. At that point, in the embodiment of FIG. 1, the tapered vertical deck 40 is interconnected to a pair of parallel vertical walls 42 which define the final segment of the infeed conveyor just upstream of the debarking drum 16 (FIG. 6). The length of the parallel walls 42 is about 10 to 15 feet in the illustrated embodiment, and the chain conveyor 32 terminates therebetween. The walls 42 are spaced apart about six feet along the length thereof. Adjacent the outlet end of the paired vertical walls 42, a free-rolling roller 44 is provided to support the logs as they are fed into the drum 16.

Figure 14:
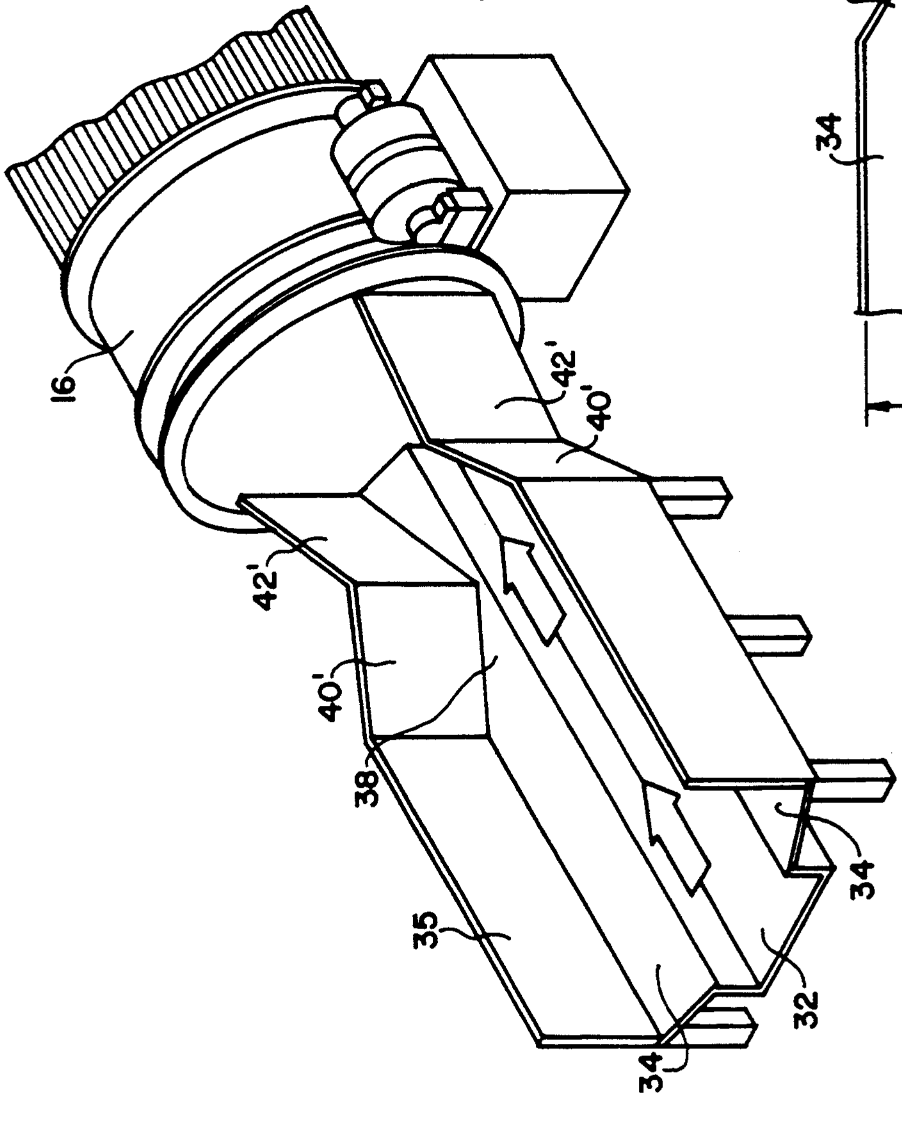
FIG. 14 is a perspective view of an alternate log deck and infeed wall configuration, in accordance with the invention.
Figure 15:
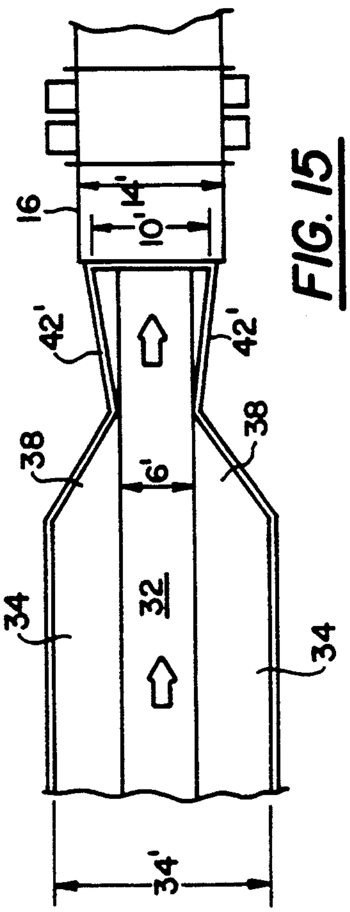
FIG. 15 is a top plan view of the configuration of FIG. 14.

In accordance with an alternate configuration of the invention, shown in FIGS. 14 and 15, the paired vertical walls 42′ flair outwardly, from a spacing of about six feet to a spacing of about 10 feet at the drum inlet. In this embodiment, walls 42′ have a length of between ten and fifteen feet, for example just over 13 feet. Furthermore, as shown by way of example in FIG. 14, when containing walls 35 are provided, the transitional walls 40′ provide a continuous transition from walls 35 to walls 42 or 42′.

Figure 16:
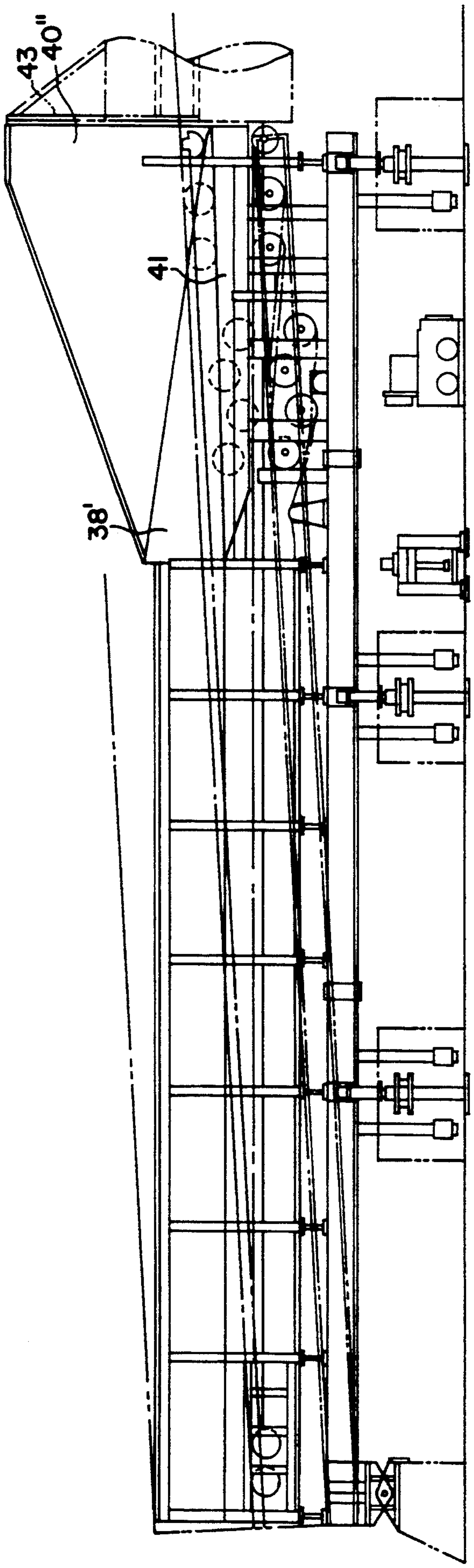
FIG. 16 is an elevational view, similar to FIG. 1, showing a further alternate and currently most preferred embodiment of the invention.
Figure 18:
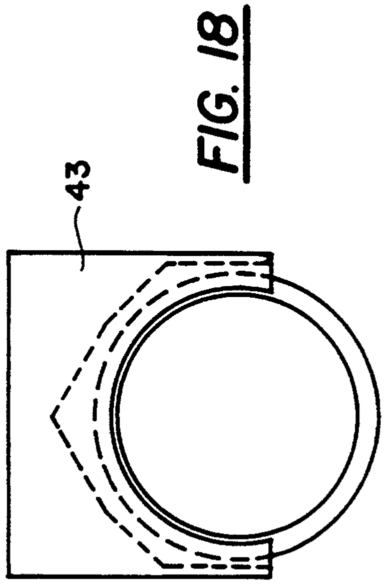
FIG. 18 is an end elevational view of a debarking drum inlet backstop in accordance with the invention.
Figure 17:
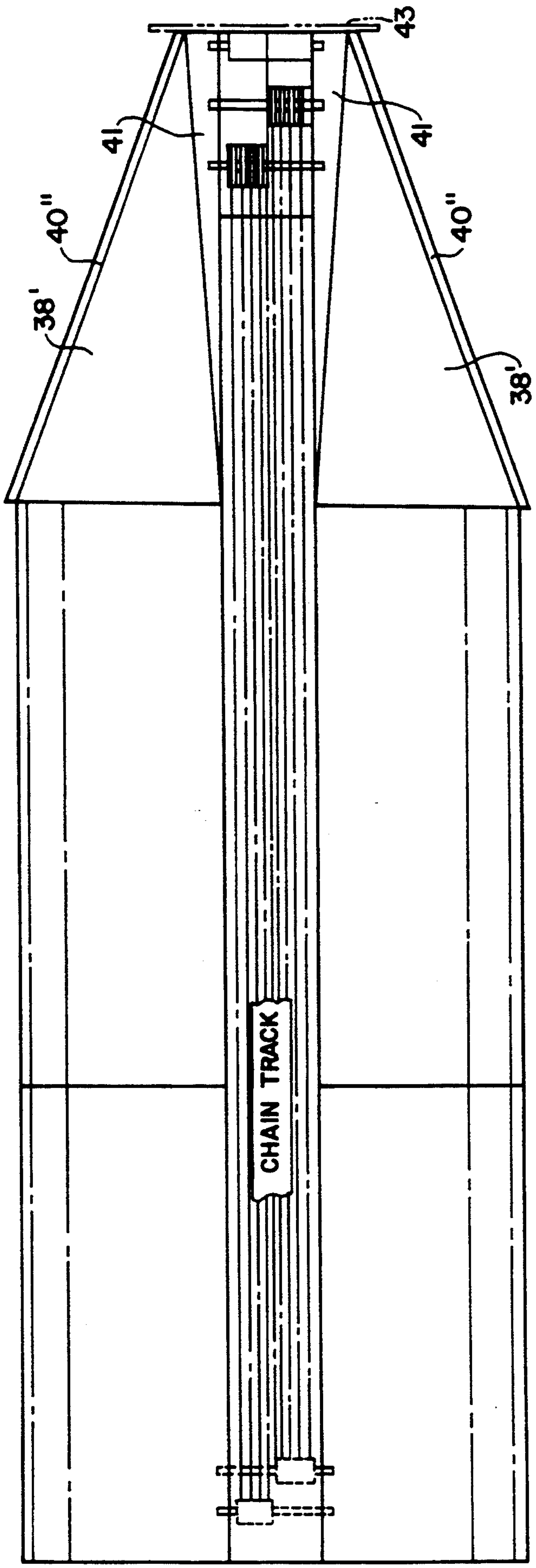
FIG. 17 is a top plan view similar to FIG. 3, of the log deck and infeed wall configuration of FIG. 16.

In accordance with yet a further alternate configuration of the invention, which is the currently most preferred embodiment and is shown in FIG. 16 and 17, the tapered log deck 38′ tapers more gradually than the embodiment of FIG. 1. Similarly the tapered vertical deck 40″ tapers more gradually than tapered vertical deck 40 so that tapered vertical deck 40″ has a maximum height where the conveyor assembly meets the debarking drum and the parallel vertical walls are not provided. Additionally the chain conveyor recess which is generally rectangular along the length of the conveyor (FIG. 4) opens up adjacent the tapered deck 38′ and tapered vertical walls 40″ as shown in FIG. 17 to define substantially triangular plate segments 41 which open up and round out the outlet end of the conveyor to more closely approximate the shape of the debarking drum inlet. In accordance with this embodiment, furthermore, a backboard unit or backstop 43 is mounted to the shell of the debarking drum inlet end as shown in phantom lines in FIG. 17 and in solid lines in FIG. 18. In the illustrated embodiment, as shown in phantom lines, the debarker cover is reinforced and the backstop is welded to the debarker cover and reinforced and supported by suitably disposed bracing. The generally plate-like backboard or backstop 43, has an arcuate lower end corresponding substantially to the shape of the inlet end of the debarking drum and is otherwise generally rectangular. The backstop 43 prevents pieces of logs and the like from being pitched up over the debarking drum during the debarking process and thus helps to contain the logs during debarking and minimizes risk for workers in the surrounding area.

The conveyor assembly of the invention is adapted to be pivoted about pivot hinge 46 to raise or lower the downstream or outlet end of the conveyor with respect to the inlet end of the drum debarker 16. More particularly, for example, when summer pine is being fed to a debarking drum, it is advantageous to have the conveyor in a lowered disposition because the bark comes off easily and an extended residency in the debarking drum is unnecessary. However, for example, when winter hard wood is being fed into the debarking drum, because the bark does not come off as easily, a longer residency in the drum may be desirable. In that event, it is desirable to feed the logs to the upper portion of the drum.

In accordance with the illustrated embodiment of the invention the downstream infeed end of the conveyor can be elevated (or lowered), as described more particularly below, to determine the locus of feed into the debarking drum, in accordance with the type and length of wood being processed. Thus, once the system is constructed, it is nevertheless possible to alter its configuration as conditions require.

Figure 7:
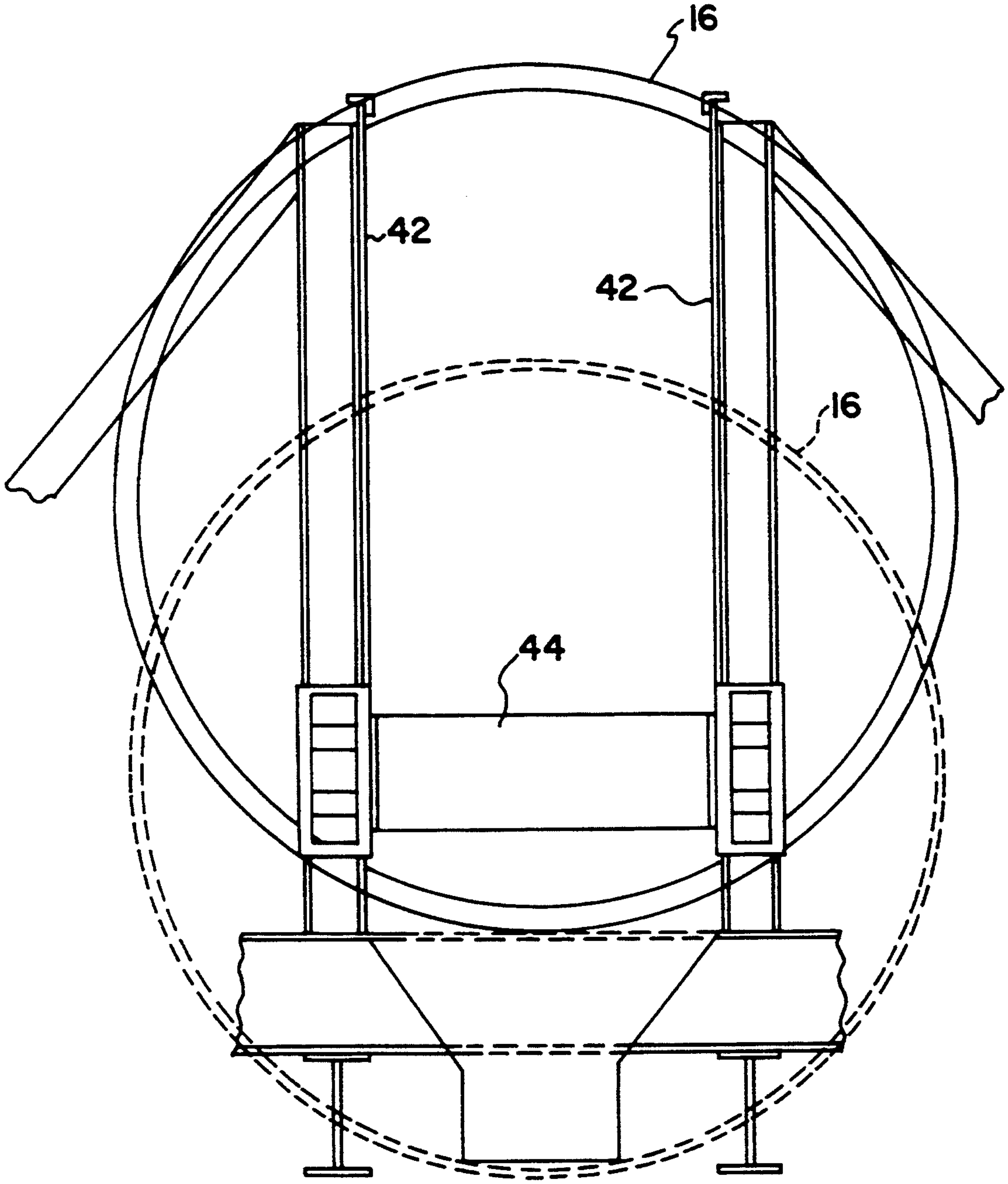
FIG. 7 is an enlarged cross-sectional view taken along line 7—7 of FIG. 3, with some parts broken away for clarity.

FIG. 7 is a view along lines 7—7 of FIG. 3 showing the drum inlet 16 in relation to the substantially parallel, vertical walls 42 of the conveyor. The debarking drum inlet end is shown in two elevations to illustrate the relationship of the conveyor to the inlet end of the debarking drum 16, depending upon whether or not the conveyor is elevated. As is apparent, the phantom view of the debarking drum, which is the lower of the two with respect to the conveyor, is the orientation when the conveyor is in its elevated disposition. The solid line view, wherein the upper edges of the vertical walls 42 of the conveyor are substantially aligned with the upper edge of the inlet of the debarking drum is the orientation when the conveyor is in its lower, preferably horizontal disposition. Thus, when the infeed conveyor is in its elevated configuration, the inlet area to the debarking drum is reduced and infeed is primarily to the upper segment of the debarking drum. In contrast, when the conveyor is lowered, the inlet area has a height equal to about three quarters of the height of the debarking drum and infeed is primarily to the lower and central portion of the drum.

In the illustrated embodiment, when the conveyor is in its lowermost position, the center line of the chain conveyor 32 is about three or four feet below the center line of the debarking drum 16, whereas in its elevated position, the illustrated conveyor is about one foot above the center line of the drum.

Furthermore, in the illustrated embodiment, when the conveyor is in its fully lowered position, the center line of the chain is about 16 feet above the ground surface and at its uppermost position is about 21 feet above the ground level. Of course the amount by which the conveyor can be raised can be varied in accordance with the needs of the particular facility. In the preferred embodiment, however, as noted above, the lowered position of the conveyor is one in which the conveyor is horizontal. Furthermore, while in the illustrated embodiment the conveyor assembly is pivotably mounted at the inlet end thereof. It is to be understood that the entire conveyor could be vertically lifted if so desired or could be constructed to be selectively pivoted and/or vertically lifted at either or both ends.

The conveyor system 14 of the inventive apparatus may be characterized as including a conveyor assembly or trough 48 as described above and a conveyor substructure or sub-frame 50 which supports the trough and provides stable interconnection to the foundation 12. As is shown in FIG. 1, the chains of the chain conveyor 32 are fed in conventional manner about the chain conveyor sprockets 52 and returned back to the inlet end of the conveyor through the sub-frame 50. Further, a bark deflecting plate 53 can be provided adjacent the conveyor sprockets 52 to collect debris from the conveyor and deliver the same to a bark conveyor (not shown) which extends under and along the drum 16 to receive bark therefrom for collection and further processing.

An assembly is provided to guide the conveyor subframe during elevation and de-elevation thereof. Specifically, support rods 54 are pivotably coupled to and extend downwardly from the sub-frame 50 of the conveyor system 14 and are disposed in sliding engagement with vertical bores in the columns 26 of the foundation 12, which were described briefly above. As described more particularly below with reference to FIGS. 10 and 11, the support rods 54 serve not only to maintain alignment and guide the conveyor during the lifting and lowering process but provide a means for locking and supporting the conveyor at a desired height and inclination.

Furthermore, slide guides 56 are mounted to and project downwardly from the sub-frame. The slide guides 56 are adapted to guide and control the conveyor assembly during elevation and descent thereof, as the cylinders 60 are actuated to lift or lower the conveyor assembly with respect to the foundation and as the support rods 54 freely slide within the bores of the columns 28. Specifically, the slide guides 56 ensure that the conveyor assembly does not shift laterally and become misaligned with the foundation.

Figure 8:
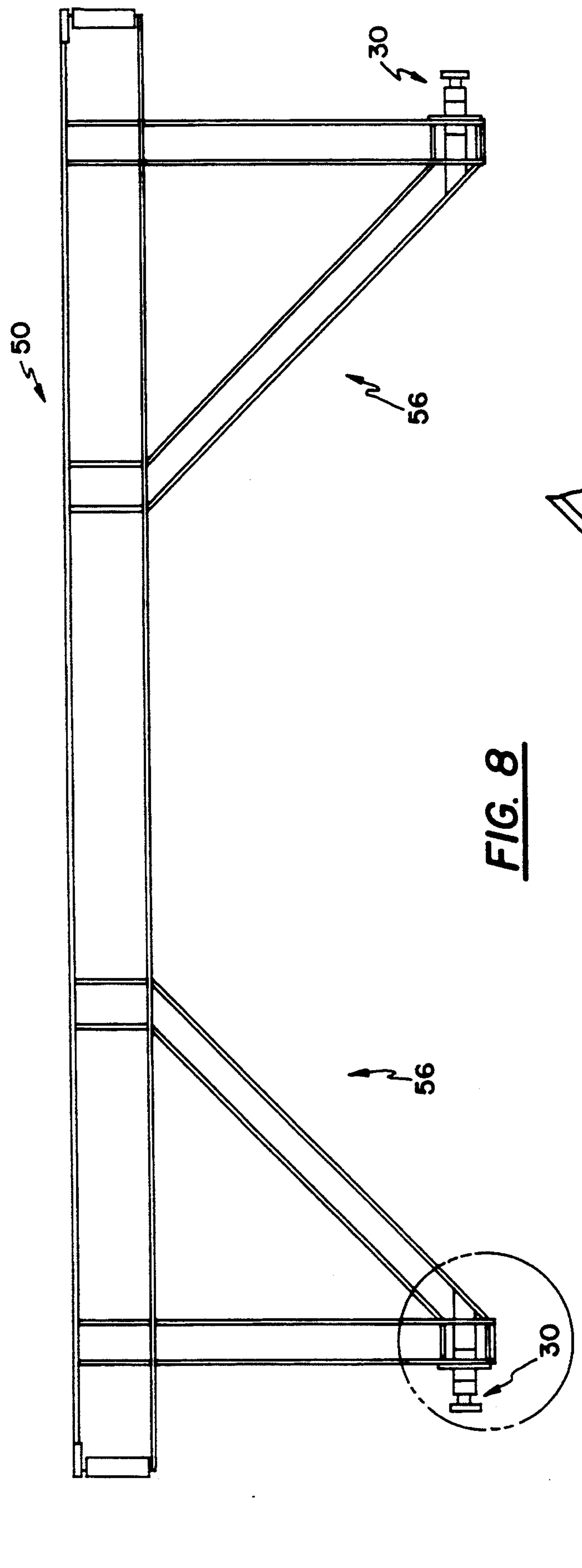
FIG. 8 is an elevational view of a slide guide assembly in accordance with the invention.
Figure 9:
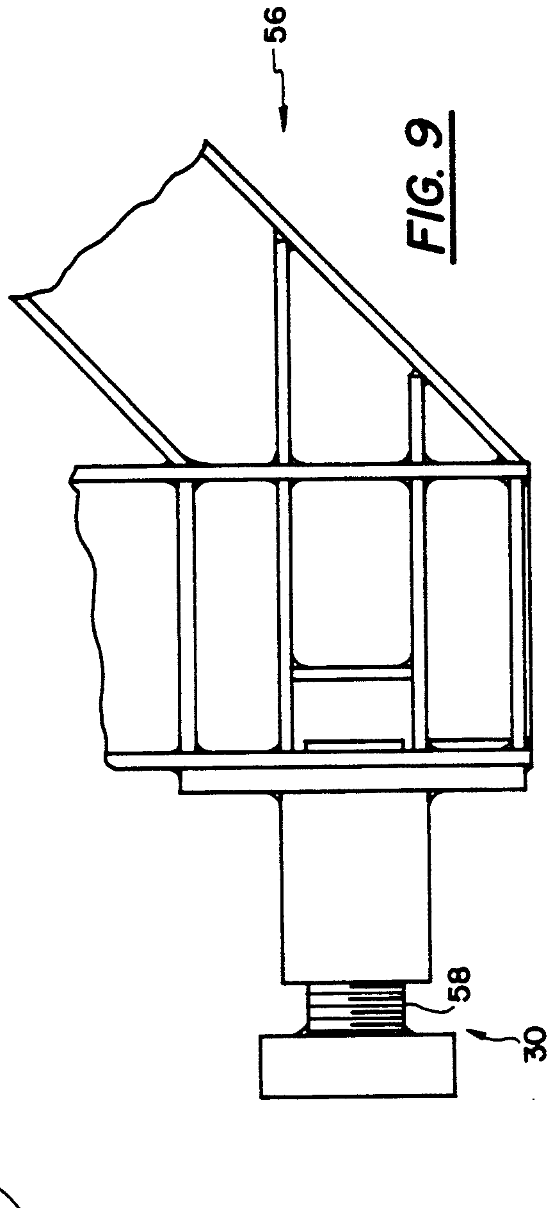
FIG. 9 is an enlarged view of detail A in FIG. 8.

A slide guide assembly in accordance with the invention is shown in FIG. 8. Each guide assembly comprises two slide guides 56 which depend downwardly from the sub-frame 50. A stop or slide member 30 projects laterally from each slide guide structure 56 and faces a respective exposed steel plate 28 in the foundation leg 22. The stop 30 can be mounted with a threaded shaft 58 which can be rotated to adjust its position relative to the leg. Abutment of the stop 30 with the exposed steel 28 of the leg 22 prevents or limits lateral shifting of the conveyor system relative to the foundation. Preferably a gap is left between the stop 30 and the leg 22 on both sides of the assembly so that a degree of play is allowed without allowing a binding or other operation hampering shift to occur. Two slide guides 56 are provided for each of the intermediate legs 22 of the foundation 12, one on each side of the inner of the two columns, in facing relation to the projecting steel plates 28 in the legs 22 of the foundation. In the illustrated embodiment only a single slide guide is provided for each of the forwardmost legs of the foundation (FIG. 1). Thus, two slide guide assemblies as shown in FIG. 8 are provided for each of the two pairs of intermediate legs and one slide guide assembly is provided for the forwardmost pair of legs 22.

As noted above, each of the rods is pivotably mounted to the conveyor sub-frame so as to depend freely downwardly so that it can easily slide in and out of the respective column 26 as the conveyor is raised or lowered. On the other hand, the slide guides 56 are rigidly attached to the sub-frame (FIG. 8) and, because of the pivotal coupling at the inlet end, as the sub-frame is lifted, will shift slightly downstream to the right (FIG. 1). The further from the pivot connection that the slide guides 56 are provided, the greater that shift or offset. This offset, however, is rather slight and the exposed steel reinforcement 28 is made sufficiently wide to accommodate such deviation.

Figure 10:
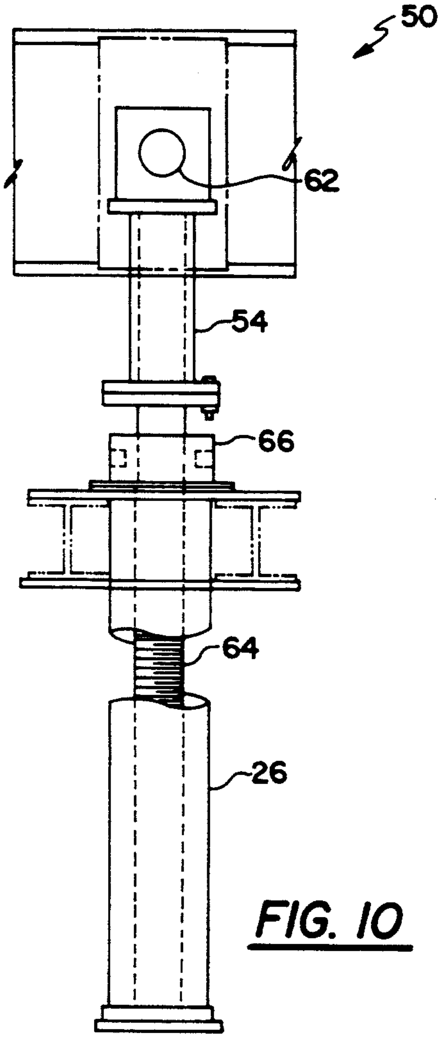
FIG. 10 is a side elevational view of a support rod and column assembly, in accordance with the invention.
Figure 11:
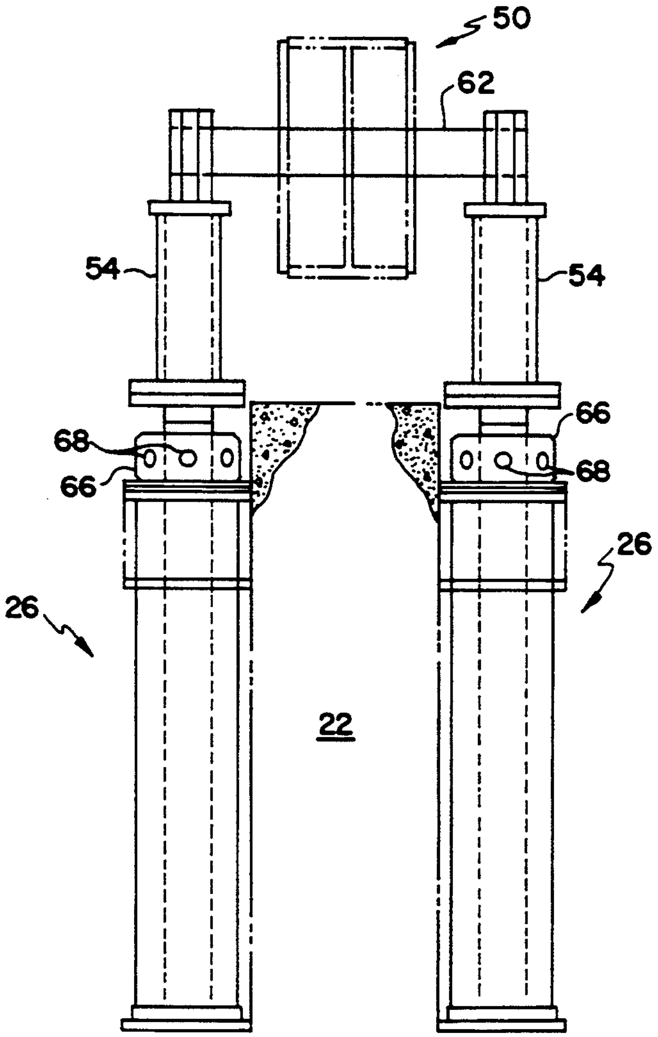
FIG. 11 is an end elevational view of the support rod and column assembly straddling a leg of the foundation, in accordance with the invention.

Detail of the support rod 54 and column 26 assembly is shown in FIGS. 10 and 11. As can be seen, the support rods 54 are pivotably coupled to the sub-frame 50 to depend downwardly therefrom to be pivotable about an axis defined by shaft 62, traverse to the longitudinal axis of the conveyor.

The support rods 54 are slidably disposed in the central bore 62 of the columns 26 of the foundation 12. Furthermore, each of the support rods 54 has an outer circumferential surface which is screw threaded as at 64 and has a nut 66 threadably engaged therewith. Preferably each nut 66 has a plurality of engagement holes 68 to facilitate rotation thereof about the respective support rod 54, as described below.

Figure 13:
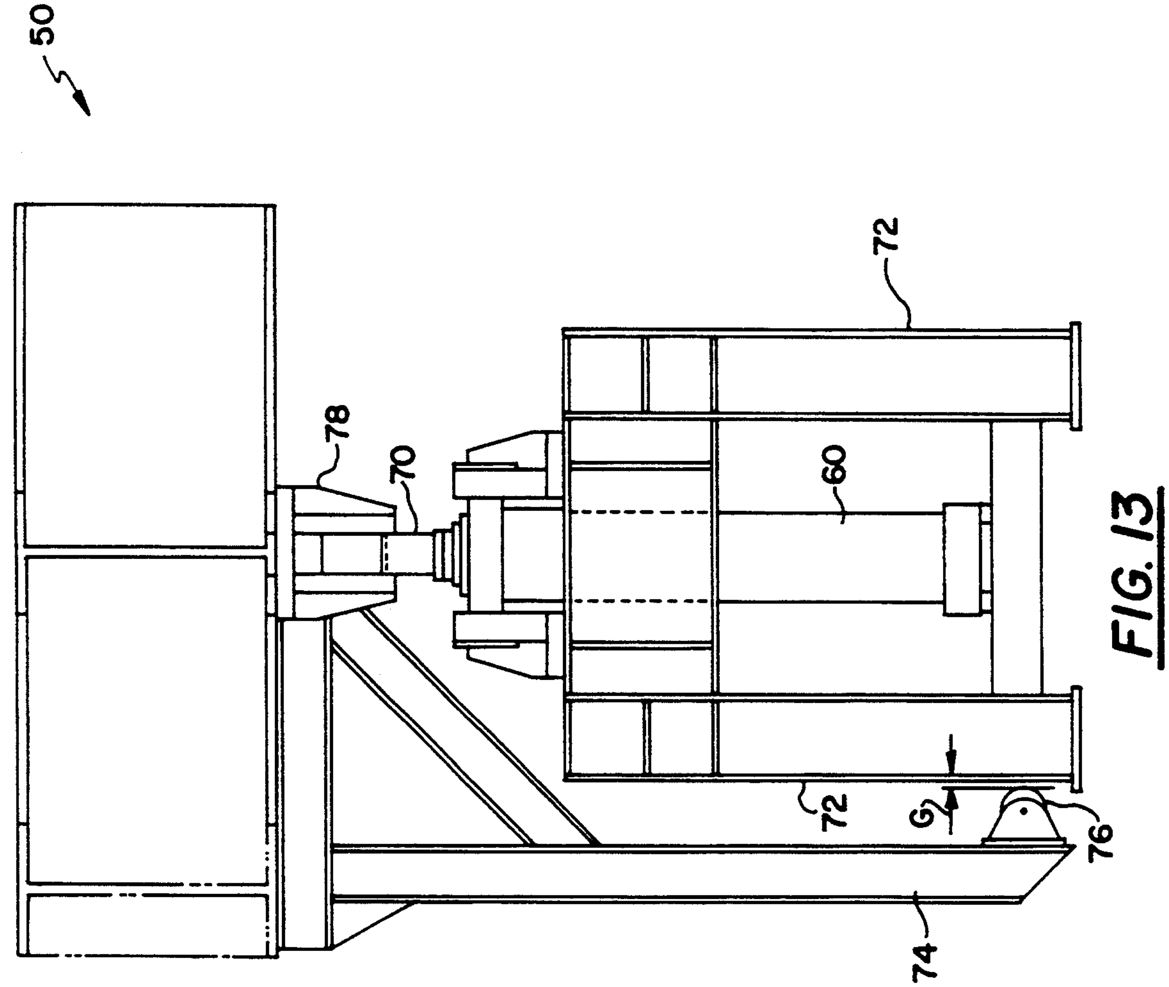
FIG. 13 is an end elevational view of the cylinder and lift guide assembly of the invention.
Figure 12:
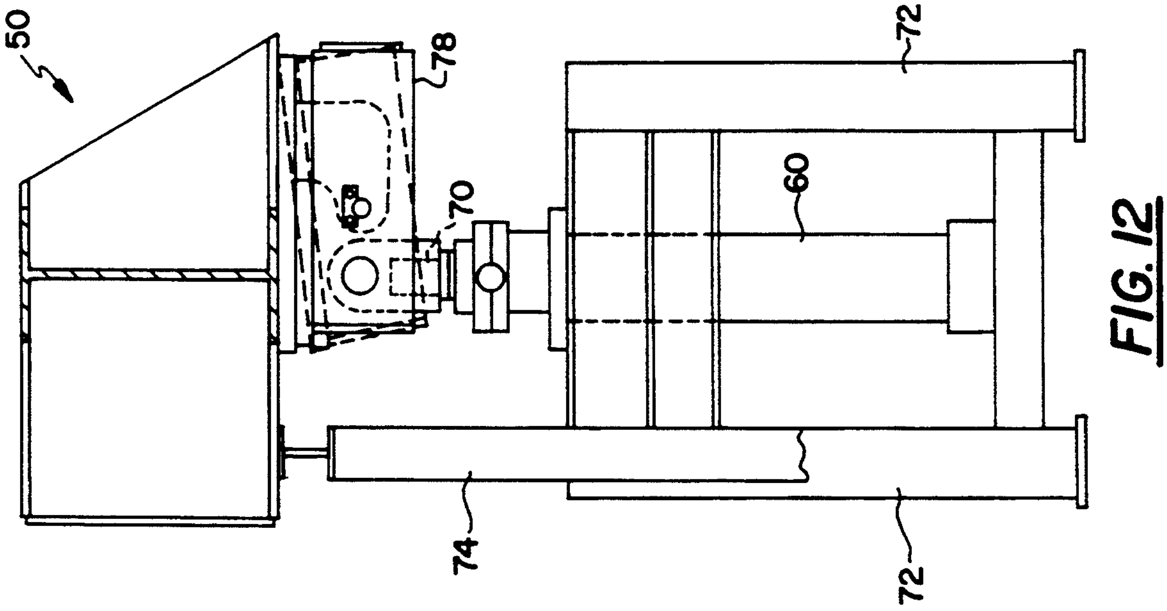
FIG. 12 is an inside elevational view of a cylinder and lift guide assembly, in accordance with the invention.

At least a pair of hydraulic cylinders 60 are provided for lifting and lowering the conveyor system of the invention, as required. The cylinders provided in accordance with the present invention are shown in FIGS. 12 and 13, which have parts broken away and parts omitted for clarity. As can be seen, the cylinder rod 70, like the support rod 54, is pivotably coupled to the sub-frame 50 of the conveyor system, so that the rod 70 and cylinder 60 will not bind as the conveyor is raised and/or lowered. The cylinder 60 itself has its own housing support frame, which in the illustrated embodiment includes four vertical beams 72, to stabilize the assembly during the lifting and lowering process.

As shown in FIGS. 12 and 13, the vertical beams 72 for the hydraulic cylinder are, for example, I beams. Furthermore, and similar to the slide guide and leg assembly, a lift guide assembly 74 is provided for each of the cylinders 60. In the illustrated embodiment only a single lift guide assembly is provided for each cylinder. The I beams 72 are oriented so that the flat end surface faces inwardly of the conveyor assembly and one of those surfaces is in facing relation to a roller wheel or like guide or stop 76 of the lift guide assembly 74 to provide a surface against which that wheel or stop 76 can roll and/or slide as necessary.

As shown in FIG. 12, the lift guide assembly 74 is positioned so as to be aligned with the edge of the I-beam 72 that is closest to the inlet end of the conveyor. Thus, as the sub-frame 50 is lifted and the lift guide assembly 74, which is fixedly connected to the sub-frame, is displaced to the left in FIG. 12 through an arc, the guide wheel or like portion 76 of the lift guide assembly 74 will remain in facing relation to the vertical beam 72 of the cylinder frame and will not shift beyond the edge thereof. It is not envisioned that the inclination of the conveyor will be to such an extent as to cause a more significant displacement of the lift guide assembly. If same is expected, then a wider engagement surface than that shown may be desirable.

As shown in FIG. 13, the guide wheel 76 of the lift guide assembly is mounted so that a gap G exists between the frame of the cylinder and the wheel 76. The same is true of the cylinder and lift guide assembly on the opposite side of the conveyor. Providing a gap G allows a degree of play in the assembly as constructed and thus prevents binding of the assembly during elevation and, rather, allows a free, albeit slight shifting of the parts.

As shown, the rod 70 of the cylinder 60, although pivotably coupled with respect to the sub-frame 50, is not directly coupled thereto. Rather, the cylinder rod 70 is pivotably coupled to a pivot plate assembly 78 which in turn is pivotably mounted to the sub-frame 50. As noted below, the indirect connection of the cylinder and the sub-frame allows the cylinder rod 70 to shift down slightly, away from the sub-frame when the cylinder is deactivated, as it normally would have a tendency to do, without completely disengaging the cylinder rod from the sub-frame.

Thus, when it is desired to elevate the conveyor assembly, the cylinders (only one of which is shown in the drawings although at least one pair should be provided in practice to ensure stable movement) are actuated to raise the conveyor and its sub-frame. Once the elevating cylinders have elevated the conveyor assembly to a desired height, the cylinders temporarily hold the conveyor assembly in its elevated position. The nuts 66 are then rotated, for example by engaging a lever arm in an engagement hole 68 and applying a force to rotate the nut 66, so that it descends along the threaded support rod 64 until it engages the upper surface of the respective column 26 and can be threaded no further. The hydraulic cylinders' pressure is then released to remove load from the cylinders so that the support rod 54 and column 26 assemblies bear the load of the conveyor system. The deactuated, relaxed cylinder rods 70 is displaced vertically downwardly and out of load bearing engagement with the sub-frame 70, even when the conveyor is loaded. This slight displacement downward, which is shown in phantom lines in FIG. 12 and which thus allows load to be removed as a result of deactivation without operative decoupling of the sub-frame and cylinders, is made possible with the double pivot lift frame assembly of the invention.

When it is desired to lower the conveyor assembly, the hydraulic cylinders 60 are first re-actuated to transfer load from the support rod/column assembly to the cylinders. Once the load has been removed from the support rods and columns, the nuts 66 can then be rotated with respect to the threaded support rods 64 to space the same from the upper end of the respective column 26. Once each of the nuts has been sufficiently displaced from its respective column, the elevating and lowering cylinders 60 can be actuated as necessary to bring the conveyor to a new inclination and/or height. The nuts 66 are then again threaded about the support rods 64 and the cylinders deactuated to again shift the load from the cylinders to the columns and supports.

While the invention has been described in connection with what is presently considered to be the most practical and preferred embodiment, it is understood that the invention is not limited to the disclosed embodiment, but, on the contrary, is intended to cover various modifications and equivalent arrangements included within the spirit and scope of the appended claims.

What is claimed is:

1. Apparatus for conveying tree-length logs to a debarking drum comprising:
   - a foundation assembly disposed along a length and width of a ground surface;
   - a conveyor system mounted to said foundation assembly so as to extend along at least a portion of the length and across at least a portion of the width of said foundation assembly, said conveyor system having an inlet end and an outlet end and being operatively coupled to said foundation assembly so that a height of at least one of said ends can be selectively varied with respect to said foundation assembly and at least temporarily fixed at one of a plurality of heights;

at least one cylinder means operatively coupled to each lateral side of said conveyor system for selectively lifting and lowering said at least one end of said conveyor system relative to said foundation assembly; and a guide unit provided adjacent each said cylinder means for limiting lateral displacement of said conveyor system relative to said foundation assembly at the locus of said cylinder means.

2. An apparatus as in claim 1, wherein said conveyor system is pivotably mounted to said foundation assembly at one of said inlet end and said outlet end of said conveyor system.

3. An apparatus as in claim 1, wherein said conveyor assembly is pivotably mounted at the inlet end thereof and the outlet end thereof is disposed adjacent an inlet of an associated debarking drum and can be altered in height by pivoted about said pivotal mounting.

4. An apparatus as in claim 3, wherein said conveyor system is selectively pivotable between a horizontal disposition and a disposition wherein said outlet end is elevated.

5. An apparatus as in claim 4, wherein said conveyor system is mounted to said foundation assembly so that when said conveyor system is in said horizontal disposition, logs are infed to a lower half of the debarking drum and when said conveyor system is elevated to a maximum height, logs are delivered to an upper half of the debarking drum.

6. An apparatus as in claim 1, wherein a rod of each cylinder means is pivotably coupled to said conveyor system.

7. An apparatus as in claim 6, wherein said rod of said cylinder means is indirectly pivotably coupled to said conveyor system.

8. An apparatus as in claim 7, wherein said rod is pivotably coupled to a pivot plate member which is in turn pivotably coupled to said conveyor system.

9. An apparatus as in claim 1, wherein said cylinder means is mounted to said foundation.

10. An apparatus as in claim 1, wherein a frame assembly is defined in surrounding relation to each said cylinder means, and wherein said guide unit selectively engages said frame assembly thereby to limit said lateral displacement.

11. An apparatus as in claim 10, wherein said guide unit comprises a guide element mounted to and depending downwardly from said conveyor system and a stop element mounted to said guide element and disposed in facing relation to said frame assembly.

12. An apparatus as in claim 1, further comprising a system for supporting and holding said conveyor system at a height and inclination determined by said cylinder means.

13. An apparatus as in claim 1, wherein said cylinder means linearly elevates said conveyor system so that the conveyor system can be disposed at any height within the range of elevations defined by said cylinder means.

14. an apparatus for conveying tree-length logs to a debarking drum comprising:

a foundation assembly disposed along a length and width of a ground surface;

a conveyor assembly mounted to said foundation assembly so as to extend along at least a portion of the length and across at least a portion of the width of said foundation assembly, said conveyor assembly having an inlet end and an outlet end and being operatively coupled to said foundation assembly so that a height of at least one of said ends can be selectively varied with respect to said foundation assembly and at least temporarily fixed at one of a plurality of heights;

a system for selectively elevating and lowering said at least one end; and a guide assembly remote from said elevating and lowering system for guiding said conveyor assembly during elevation and de-elevation thereof.

15. An apparatus as in claim 14, wherein said guide assembly comprises column members mounted at spaced locations along the length and width of said foundation, each said column member having a vertical bore defined therein, and support rods pivotably mounted to said conveyor assembly, each said support rod being slidably disposed in the vertical bore of a respective said column member.

16. An apparatus as in claim 15, wherein said guide assembly further comprises a plurality of slide guide members for limiting lateral displacement of said conveyor assembly relative to said foundation assembly.

17. An apparatus as in claim 16, wherein said foundation assembly includes a plurality of upstanding leg members, wherein said slide guide members depend downwardly from said conveyor assembly so as to be disposed immediately adjacent to but spaced from each said leg member, so that engagement of a said slide guide member with a said leg member limits lateral displacement of said conveyor assembly relative to said foundation assembly.

18. An apparatus as in claim 17, wherein at least some of said slide guide members are fixedly mounted with respect to said conveyor assembly.

19. An apparatus as in claim 17, wherein a said column member is disposed on each lateral side of each said leg member.

20. An apparatus as in claim 17, wherein said slide guide members are disposed laterally inwardly of said leg members.

21. An apparatus as in claim 14, wherein said conveyor assembly comprises a sub-frame assembly, means for conveying tree-length logs along the length of said sub-frame assembly and first and second inclined side walls defining log decks for containing logs on said conveyor means as said logs are conveyed therealong.

22. An apparatus as in claim 21, further comprising first and second substantially vertical side walls adjacent said debarker drum inlet for containing logs as they are infed into the debarking drum.

23. An apparatus as in claim 22, wherein said vertical side walls are substantially parallel.

24. An apparatus as in claim 22, wherein said vertical side walls gradually increase in height along the length thereof.

25. An apparatus as in claim 24, wherein said vertical side walls are oriented to approach one another in the direction of the debarking drum to guide and direct logs into the debarking drum.

26. An apparatus as in claim 22, in combination with a debarking drum having a backstop plate mounted to an inlet end thereof to extend upwardly from an inlet opening in the inlet end.

27. An apparatus as in claim 26, wherein said vertical side walls terminate distally immediately adjacent an inlet face of the debarking drum defined by said inlet end and said backstop.

28. An apparatus as in claim 21, further comprising a free-rolling roller adjacent an outlet end of said conveyor means for guiding logs into the debarking drum.

29. An apparatus as in claim 14, further comprising a system for supporting and holding said conveyor assembly at a height and inclination determined by said system for selectively elevating and lowering.

30. An apparatus as in claim 29, wherein said system for supporting and holding comprise threads on each said support rod and a nut threadably mounted to each said support rod whereby once said conveyor assembly has been elevated to a desired position, said nut can be threadably displaced on said support rod into abutting relation with the respective column member whereby when a force of said elevating system is released, engagement of said nut with said column member supports and holds said conveyor assembly in said desired position.

31. An apparatus as in claim 14, wherein said guide assembly comprises a plurality of slide guide members for limiting lateral displacement of said conveyor assembly relative to said foundation assembly.

32. An apparatus as in claim 31, wherein said foundation assembly includes a plurality of upstanding leg members, wherein said slide guide members depend downwardly from said conveyor assembly so as to be disposed immediately adjacent to but spaced from each said leg member, so that engagement of a said slide guide member with a said leg member limits lateral displacement of said conveyor assembly relative to said foundation assembly.

33. An apparatus as in claim 32, wherein at least some of said slide guide members are fixedly mounted with respect to said conveyor assembly.

34. An apparatus for conveying tree-length logs to a debarking drum comprising:

- a foundation assembly disposed along a length and width of a ground surface, said foundation assembly comprises at least one slab of reinforced concrete;
- a conveyor assembly mounted to said foundation assembly so as to extend along at least a portion of the length and across at least a portion of the width of said foundation assembly, said conveyor assembly having an inlet end and an outlet end and being operatively coupled to said foundation assembly so that a height of at least one of said ends can be selectively varied with respect to said foundation assembly and at least temporarily fixed at one of a plurality of heights.

35. An apparatus as in claim 34, further comprising a vehicle ramp defined on said foundation assembly at said inlet end of said conveyor assembly.

36. A method of infeeding logs to a debarking drum, comprising:

- providing an elongated conveyor assembly having a log inlet end and an outlet end, said outlet end being provided adjacent the debarking drum;
- providing an assembly for altering a vertical height of at least one of said inlet end and said outlet end of said conveyor assembly;
- providing a guide assembly for limiting lateral displacement of said conveyor assembly, said guide assembly being remote from said height altering assembly;
- selectively altering a vertical height of at least one of said inlet end and said outlet end of said conveyor assembly to thereby determine a locus of log infeed to the debarking drum;
- during said step of altering, guiding said conveyor assembly with said guide assembly to limit lateral displacement thereof; and
- conveying logs on said conveyor assembly to and into said debarking drum.

37. A method as in claim 36, further comprising supporting and holding said conveyor at said selected height.

38. A method as in claim 36, wherein said step of providing comprises providing a conveyor assembly having an inlet end which is pivotably mounted to a foundation assembly and wherein said step of selectively altering comprises selectively pivoting said conveyor assembly about the pivot mounting to selectively alter a height of said outlet end.

39. A apparatus for conveying logs to a debarking drum comprising:

- a support frame;
- a conveyor for conveying logs along at least a portion of the length of said support frame, said conveyor having an inlet end and an outlet end;
- cylinder means for selectively altering a height of at least one of said ends of said conveyor with respect to the ground and at least temporarily fixing said conveyor at a selected one of a plurality of heights; and
- a guide assembly remote from said cylinder means for guiding said conveyor assembly during elevation and de-elevation thereof.

40. An apparatus as in claim 39, further comprising a foundation assembly, formed at least in part from reinforced concrete, said support frame being mounted to said foundation assembly, at least one of a height and inclination of said support frame with respect to said foundation being selectively variable so that the height of at least one of the ends of the conveyor can be varied.

41. An apparatus as in claim 39, wherein said guide assembly comprises column members mounted at spaced locations along the length and width of said foundation assembly, each said column member having a vertical bore defined therein, and support rods pivotably mounted to said support frame, each said support rod being slidably disposed in the vertical bore of a respective said column member.

42. An apparatus as in claim 41, wherein said guide assembly further comprises a plurality of slide guide members for limiting lateral displacement of said support frame relative to said foundation assembly.

43. An apparatus as in claim 42, wherein said foundation assembly includes a plurality of upstanding leg members, wherein said slide guide members depend downwardly from said support frame so as to be disposed immediately adjacent to but spaced from each said leg member, so that engagement of a said slide guide member with a said leg member limits lateral displacement of said support frame relative to said foundation assembly.

* * * * *